United States Patent
Bigi

(10) Patent No.: US 6,789,440 B2
(45) Date of Patent: Sep. 14, 2004

(54) DEVICES FOR THE SEQUENTIAL CONTROL OF GEARBOXES WITH HAND-OPERATED SELECTION AND ENGAGEMENT OF GEARS FOR MOTOR VEHICLES

(75) Inventor: Maurizio Bigi, Novi Di Modena (IT)

(73) Assignee: Automac S.A.S. Di Bigi Ing. Maurizio, Novi Di Modena (IT)

( * ) Notice: Subject to any disclaimer, the term of this patent is extended or adjusted under 35 U.S.C. 154(b) by 0 days.

(21) Appl. No.: 10/359,656

(22) Filed: Feb. 7, 2003

(65) Prior Publication Data

US 2003/0213319 A1 Nov. 20, 2003

Related U.S. Application Data

(63) Continuation of application No. PCT/IT01/00443, filed on Aug. 8, 2001.

(30) Foreign Application Priority Data

Aug. 10, 2000 (IT) .................................... MO2000A0175

(51) Int. Cl.$^7$ ............................................... F16H 59/00
(52) U.S. Cl. ..................................................... 74/337.5
(58) Field of Search ........................................ 74/337.5

(56) References Cited

U.S. PATENT DOCUMENTS

| 2,469,881 A | 5/1949 | Johnson |
| 5,966,990 A | 10/1999 | Sander et al. |

FOREIGN PATENT DOCUMENTS

| EP | 0 616 153 A | 9/1994 |
| JP | 01 046 049 A | 2/1989 |
| WO | WO 96 23995 A | 8/1996 |

*Primary Examiner*—Dirk Wright
(74) *Attorney, Agent, or Firm*—Sughrue Mion, PLLC

(57) ABSTRACT

A device for the sequential control of a gearbox with hand-operated selection and engagement of gears for motor vehicles, the gearbox including a plurality of forks (1) for actuating corresponding groups of gearwheels, comprises: a rotatable drum (11) equipped with one cam groove (12); a plurality of studs (13) engaging in the cam groove (12) for being moved parallel to the axis of the drum (11); an angle selector (15, 16) for controlling rotation of the drum (11); actuating members (2, 3, 4, 7, 9) each connecting a stud (13) to a respective fork (1) so as to cause each fork to translate axially fast with the respective stud (13). The actuating members comprise first (3, 4) and second (7, 9) axially mobile elements, wherein each first mobile element is fast for translation with a rod (2) connected to a respective fork (1) and each second mobile element is fast for translation with a respective stud (13) and a respective first mobile element.

8 Claims, 5 Drawing Sheets

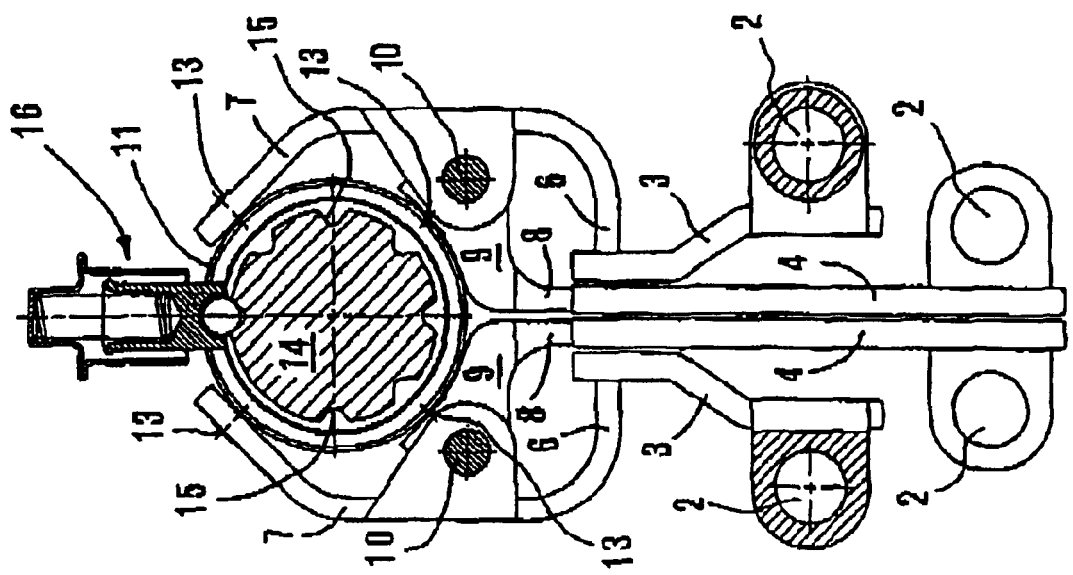
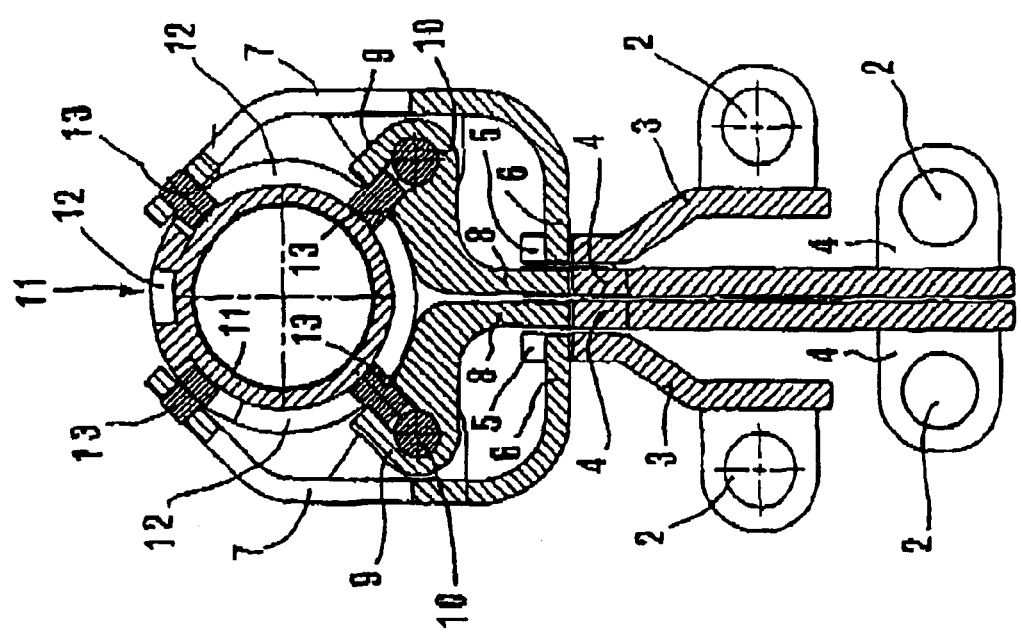

DEVICES FOR THE SEQUENTIAL CONTROL OF GEARBOXES WITH HAND-OPERATED SELECTION AND ENGAGEMENT OF GEARS FOR MOTOR VEHICLES

This is a continuation of Application No. PCT/IT01/00443 filed Aug. 8, 2001; the above noted prior applications are all hereby incorporated by reference.

BACKGROUND OF THE INVENTION

The invention relates to a device which enables the driver of a motor vehicle to control sequentially a gearbox of the traditional type, that is, with hand-operated selection and engagement of gears. A gearbox of this type, hereinafter referred to as a gate change gearbox, is generally controlled by a selection lever which, through rotations and successive translations, is capable of selecting and engaging the required gear by shifting the corresponding gearwheels by means of a detent.

Devices for the sequential control of gate change gearboxes are disclosed, for example, in European patent application EP 0 616 153 and in international patent application WO 96/23995.

The above-mentioned European document discloses a control device which provides for the use of radial positive cams capable of engaging the gearwheels corresponding to the selected gear as a result of the rotation of a camshaft; a ratchet selector controls the stepwise rotation of the said camshaft towards a higher or lower gear in accordance with the command given by the operator through the gear selection lever. This solution has considerable mechanical complexity, involves the simultaneous use of all the cams and requires additional linkages to enable the cams to select and engage the desired gear.

The above-mentioned international patent application, on the other hand, discloses a device for controlling the two actuating levers of a traditional gate change gearbox in which the rods connected to these levers are set in motion by arms which are in turn connected to a rotating drum equipped with a pair of axial cams which engage pins provided on these arms. The stepwise rotation of the drum, which in this case also is brought about by means of a ratchet selector, enables each of the two cams constantly to control the position of one of the levers and hence the position of the group of gearwheels of the gearbox connected thereto. This solution also has the disadvantage of considerable mechanical complexity, since it involves the use of further mechanical members in addition to the existing controls. Moreover, it can be applied only to gearboxes operated by means of a double lever, unless a further mechanical unit is introduced to combine the movements of the various actuating members. Furthermore, the engine compartment of the vehicle is encumbered by the linkages and the housing of the drum, which has to be positioned outside of and separately from the gearbox.

SUMMARY OF THE INVENTION

It is the object of the present invention to provide an improved device for the sequential control of a gate change gearbox, which is structurally simple and easy to manufacture, which is of compact sizes, particularly in the axial direction, which consists of few components and which can be operated either in a completely automatic mode or with the possibility to shift between automatic and manual modes.

The invention solves the above technical problems by providing a device for the sequential control of gearboxes with hand-operated selection and engagement of gears for motor vehicles. Further advantageous characteristics are defined in the dependent claims. vehicles. Further advantageous characteristics are defined in the dependent claims.

As will be described in more detail below, a control device according to the present invention offers the following advantages: the space taken up in the engine compartment is reduced to a minimum; mechanical performance is optimised; the forks of the gearwheel groups of the gearbox can be actuated directly; operation can be readily automated.

BRIEF DESCRIPTION OF THE DRAWINGS

The invention will be illustrated now, purely by way of example, with reference to the attached drawings, in which

FIG. 3 is a view of the control device of FIG. 1 diametrically sectioned along the cam groove of the drum;

FIG. 4 is a partially sectioned view of the drum angle selector of the control device of FIG. 1;

DETAILED DESCRIPTION OF THE PREFERRED EMBODIMENTS

Figure 1:
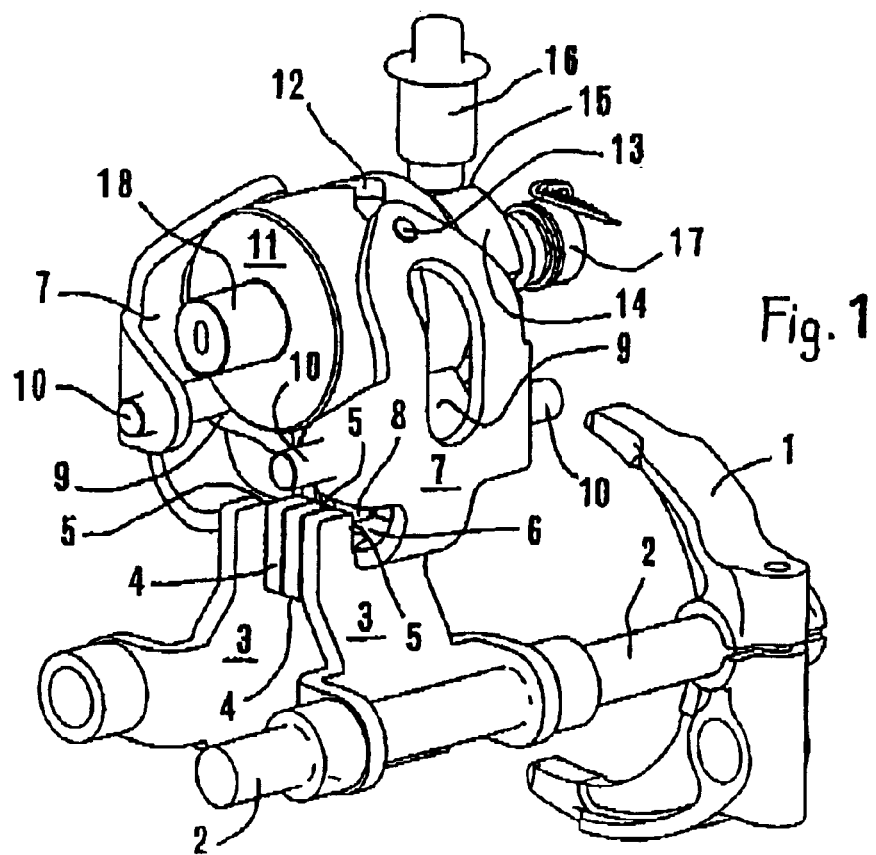
FIG. 1 is a partial perspective view of the device for the sequential control of a gate change gearbox according to the invention.
Figure 2:
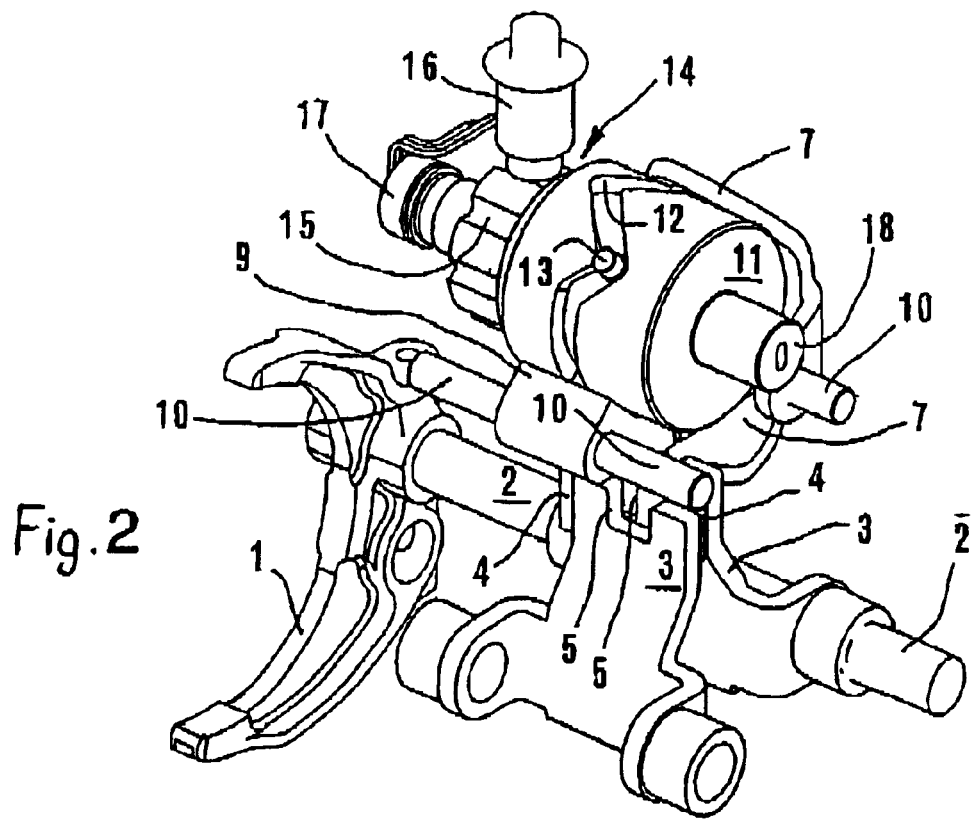
FIG. 2 is a view similar to that of FIG. 1, taken from a different point of view, in which one of the external forks and one of the external fork-like elements are not shown.

With particular reference to FIGS. 1 and 2 to 4, a fork 1, intended to shift a corresponding group of gearwheels of a gate change gearbox, is rigidly connected to an axial rod 2. In order the said rod to be fast for the motion of axial translation (where the term "axial" will indicate hereinafter a direction parallel to the axis of rotation of the rotating drum), the rod is connected to an external toothed plate 3 for transmitting the axial motion to the respective fork 1. Toothed plates 4, internal to plates 3, are connected to analogous axial rods and forks (not shown as being per se known in prior art). Openings 5 are provided in plates 3 and 4 for engaging fingers 6 and 8 of external fork-like elements 7 and cursors 9, respectively. A pair of axial pins along which the fork-like elements 7 and the cursors 9 are slidably mounted are indicated 10. A rotating selection drum 11 has a cam groove 12 engaging a plurality of studs 13 (in this case four studs, one for each fork-like element or cursor), whereby the studs are axially moved as a result of rotation of the drum. One end of the drum 11 has splines 15 engaging a spring-loaded dog 16 to allow selection of the angle position of the drum, which position can be detected by means of a sensor 17. The opposite end 18 of the drum 11 receives the external commands imparted by the operator through a sequential-type selection lever.

Figure 5:
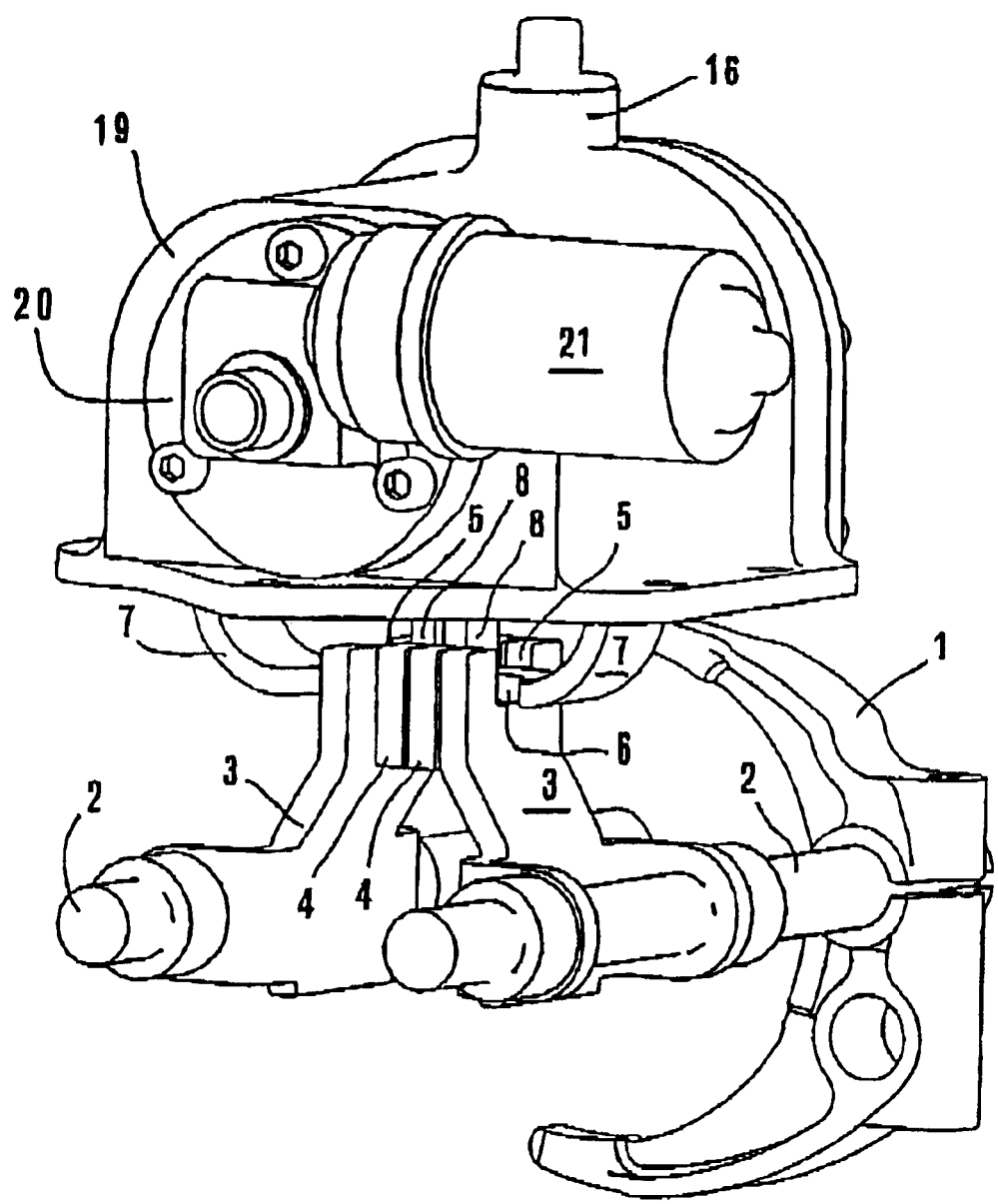
FIG. 5 is a perspective view of the control device according to the invention, in which the drum is actuated by an electrically-operated geared motor.
Figure 6:
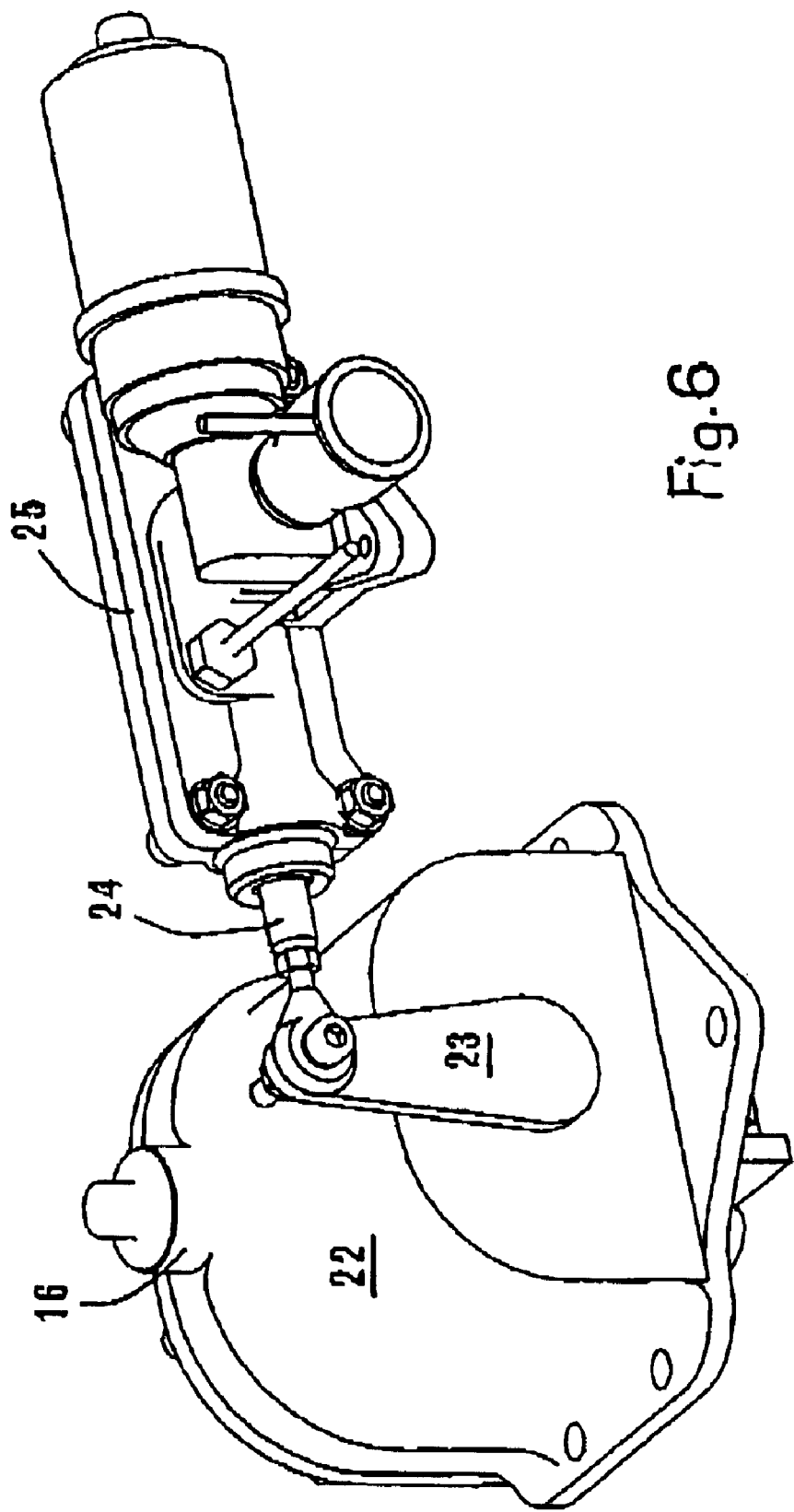
FIG. 6 is a perspective view of an actuator for rotating the drum of the control device.
Figure 7:
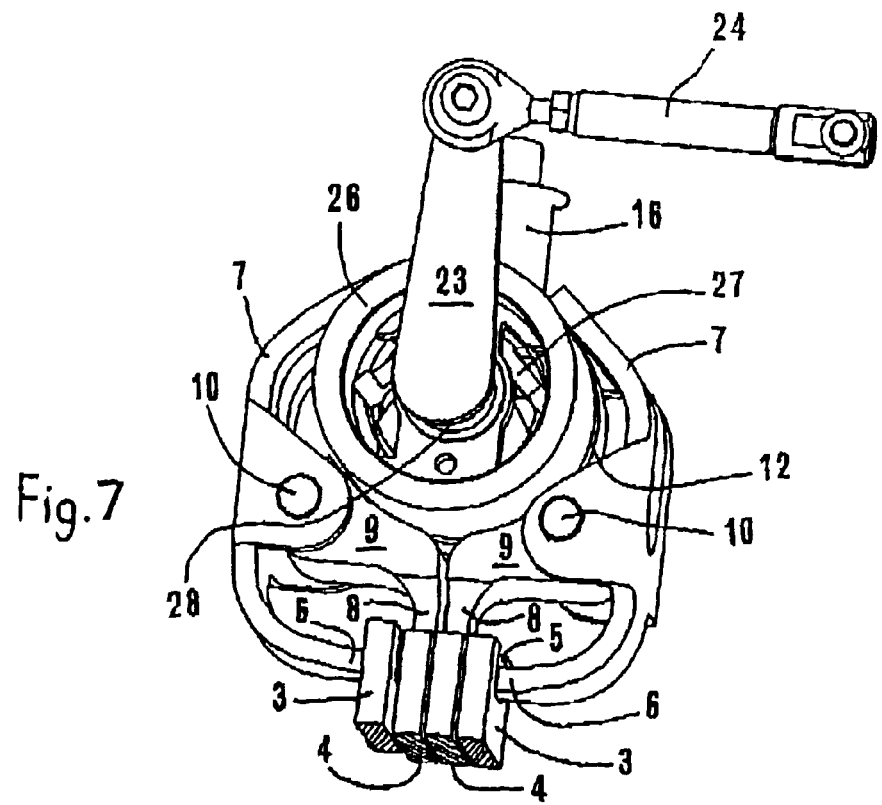
FIG. 7 is a perspective view of a ratchet mechanism arranged in the drum of the control device according to the invention.

In the embodiment illustrated in FIG. 5, an external housing 19 of the control device is equipped with a cover 20 on which a reduction unit 21 is mounted. In the embodiment illustrated in FIG. 6, the external housing 22 of the control device carries a lever 23 for actuating the drum 11. The lever 23 is connected to a rod 24 of an electromechanical actuator 25, which at each cycle is shifted to and fro, starting from a central position, along a straight path substantially perpendicular to the drum axis. FIG. 7 shows in particular a drum 26 equipped internally with a bi-directional ratchet mechanism 27 of known type, arranged to return the lever 23 to the central position after each selection. An end portion of the ratchet mechanism 27 is indicated 28.

Figure 8:
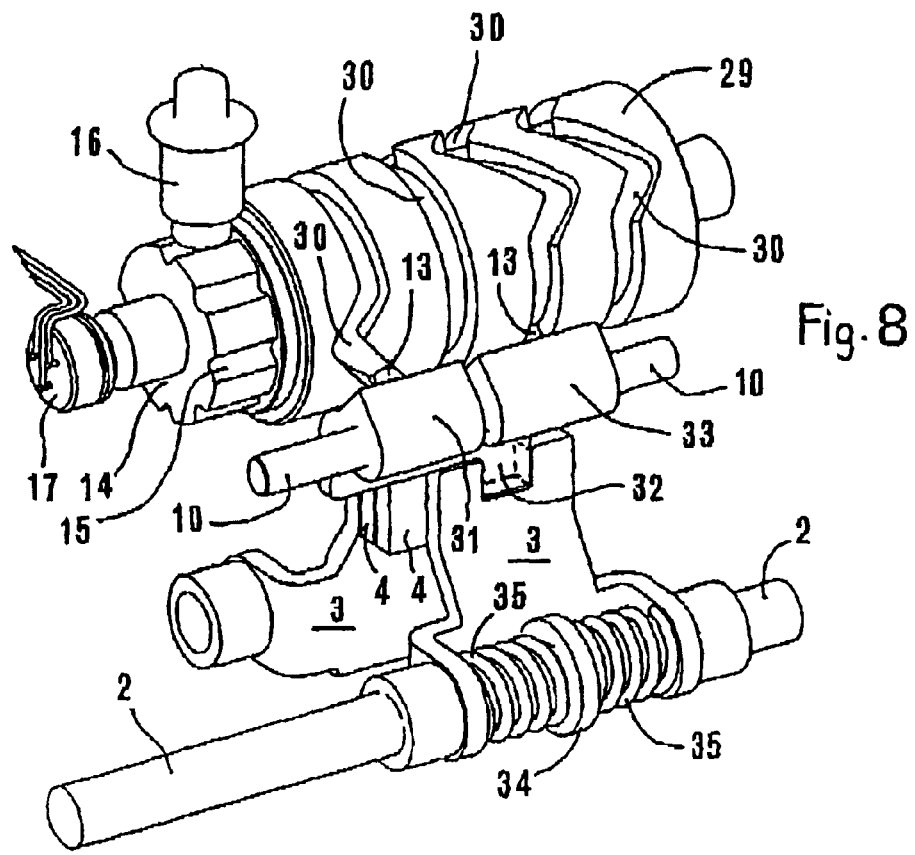
FIG. 8 is a perspective view of a drum for a control device according to the invention, equipped with a plurality of cam grooves, each arranged to actuate a single cursor and thus control the respective fork of the gearbox.

Finally, with reference to FIG. 8, a drum 29 is equipped with a plurality of cam grooves 30, in this case four grooves, arranged to control cursors 31 and 33, respectively, by means of corresponding studs 13, as in the case of the drum 11 with a single cam groove 12 described with reference to FIGS. 1 and 2 to 4. Numeral 32 indicates a finger of the cursors 31 and 33, which are preferably placed side by side in pairs on the same axial pin 10. An intermediate stop member 34 in the form of a shoulder is located between hub-like portions of the plates 3 and 4 (only the stop member associated to one of the plates 3 is illustrated), between which the respective axial rod 2 slides. A pair of springs 35 is placed between the stop member 34 and the said hub-like portions to achieve an elastic coupling between the respective plate and the associated assembly consisting of a rod 2 and a fork 1.

The operation of the control device according to the invention will now be described, with reference to the above first embodiment (FIGS. 1 to 6). The operator operates sequentially the gearbox selection lever (not illustrated) and, by means of a linkage of known type, acts on lever 23 or on the control micro-switches of the geared motor 21 or of the electromechanical actuator 25. Both the manual and the automatic operation cause the drum 11 to rotate through one step, so that one of the studs 13 engaged in the cam groove 12 is axially moved and, in its turn, brings about the axial motion of the rod 2 and of the respective fork 1 by means of the assembly consisting of the respective cursor 9 or fork-like element 7 and of the respective plate 3 or 4, whereby the fork 1 engages the group of gearwheels of the gearbox corresponding to the desired gear. The different circumferential position of the four studs 13 engaged in the single cam groove 12 of the drum 11 ensures that the studs are controlled one by one, thereby reducing considerably the overall sizes of the device. The angle selector 15, 16 sets the exact rotation to be imposed on the drum 11 in order to select the gears in a predetermined sequence. The angle sensor 17 reads the rotation of the drum to verify that the rotation imposed on it by means either of the manual command or of the electromechanical actuator 25 is sufficient to ensure the engagement of the desired gear.

Where the control device is equipped with the geared motor 21 or the electromechanical actuator 25, its operation can be completely automated while enabling at the same time manual intervention. In case of control by means of a geared motor, operation must always be electrical and may be effected either manually, by means of a pair of buttons (for up- and down-shifting, respectively), or automatically, by means of a control unit capable of establishing, on the basis of operational parameters of the vehicle, which gear to engage.

Finally, the elastic axial coupling provided by the springs 35 and by the stop member 34 located between the rods 2 and the hub-like portions of the plates 3, 4 ensures a smoother operation of the gearwheel groups of the gearbox.

The main advantages offered by a control device according to the present invention are the following. Firstly, it is extremely compact and can be inserted in place of the detent lever and linkages generally used in gearboxes of this type. Secondly, it can be fitted to gate change gearboxes already mounted on the vehicle with the use of a kit of replacement components enabling the gearbox to be modified from traditional to sequential; this is particularly advantageous in mass production, since it avoids the need to design new gearboxes directly with sequential control and offers the purchaser the chance of having a vehicle already equipped with a sequential control device in a shorter time. Thirdly, it has a more direct action compared to known solutions, since a single part of a cam is always engaged without any increase in overall size: the remaining part of cam simply sets the respective cursor in neutral position, thereby avoiding errors or malfunctions of the gearwheel groups of the gearbox.

Of course, the principle of the invention remaining unchanged, embodiments and manufacturing details may vary widely from those described and illustrated, purely by way of example, without departing from the scope of the invention as defined in the attached claims.

What is claimed is:

1. A device for the sequential control of a gearbox with hand-operated selection and engagement of gears for motor vehicles, the gearbox including a plurality of forks (1) for actuating corresponding groups of gearwheels; the device comprising;

a rotatable drum (11;26) equipped with one cam groove (12);

a plurality of studs (13) engaging in the cam groove (12) for being moved in axial directions parallel to the axis of rotation to the drum;

an angular selector (15, 16) for controlling rotation of the drum;

actuating means (2, 3, 4, 7, 9) each connecting a stud (13) to a respective fork (1) so as to cause each fork to translate axially fast with the respective stud (13);

wherein the actuating means comprise first (3, 4) and second (7, 9) axially mobile elements, each first mobile element (3, 4) being fast for translation with a rod (2) connected to a respective fork (1) and each second mobile element (7, 9) being fast for translation with a respective stud (13) and a respective first mobile element (13).

2. The device of claim 1, wherein the second mobile elements include cursors (9) and the fork-like elements (7) sliding on pins (10) parallel to the axis of the drum (11;26).

3. The device of claim 1, wherein the said second mobile elements comprise a first cursor (9) and a first fork-like element (7) sliding on a first pin (10), and a second cursor (9) and a second fork-like element (7) sliding on a second pin (10).

4. The device of claim 3, wherein the fork-like elements (7) are external to the cursors (9).

5. The device of claim 1, wherein each first mobile element (3, 4) is connected to the respective second mobile element (7, 9) by a terminal finger (6, 8) provided by the second mobile element (7, 9) and engaging an opening (5) formed in the first mobile element (3, 4).

6. The device of clam 1, wherein the first mobile elements (3, 4) are connected with the respective rods (2) through axially elastic means (35).

7. A kit for modification of the control of a gearbox with hand-operated selection and engagement of gears for motor vehicles, comprising a device for the sequential control of the gearbox according to claim 1.

8. A motor vehicle equipped with a gearbox with hand-operated selection and engagement of gears, comprising a device for the sequential control of the gearbox according to claim 1.

\* \* \* \* \*